April 8, 1952      C. G. THORSEN      2,591,891
DEMOUNTABLE STRUCTURE
Filed Jan. 26, 1948
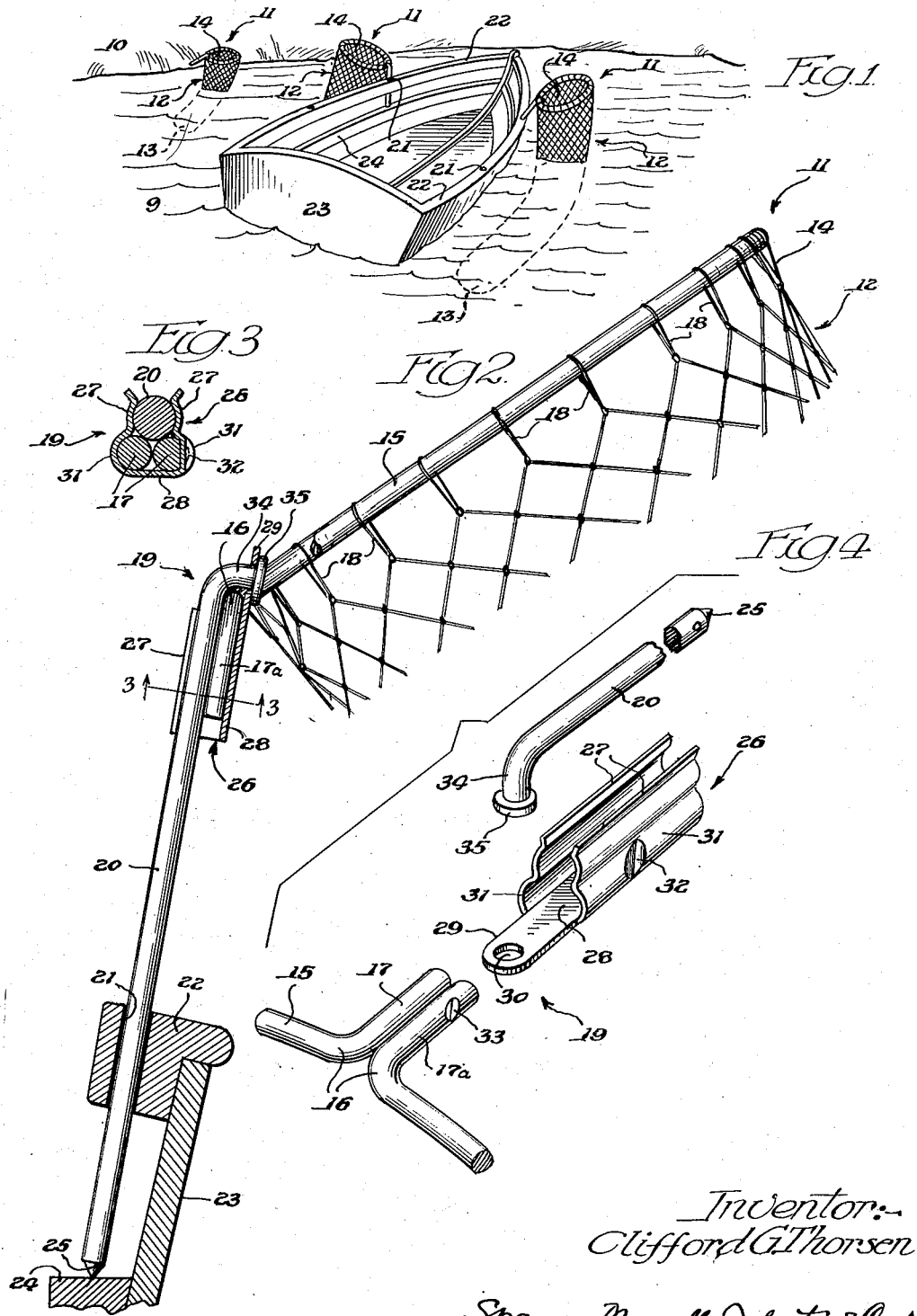
Inventor:—
Clifford G. Thorsen
By:— Spencer, Marzall, Johnston & Cook
attys Patented Apr. 8, 1952

2,591,891

UNITED STATES PATENT OFFICE 2,591,891

DEMOUNTABLE STRUCTURE

Clifford G. Thorsen, Chicago, Ill.

Application January 26, 1948, Serial No. 4,383

10 Claims. (Cl. 43—55)

The present invention relates in general to fishing equipment, and has more particular reference to a creel net structure in which fish may be impounded, under water after having been captured. The invention relates further to a collapsible structure comprising a takedown mounting particularly well adapted for removably attaching a handle to the creel net structure, though the invention is not necessarily limited, so far as the mounting is concerned, to the attachment of a handle on a creel net, but may have wider and more general application.

An important object of the present invention is to provide improved, convenient and inexpensive means for impounding fish, said means comprising a creel net in which fish may be placed alive and submerged under water; a further object being to provide an improved collapsible device for supporting the net, including a mounting ring for the open end of the net whereby it may be supported in position trailing in water for fish impounding purposes; a still further object being to provide a readily removable handle for convenience in manipulating the net or for anchoring it on a fishing boat, or in the bank of a pond or stream.

Another important object is to provide an improved demountable structure for the interconnection of members to be joined; a further object being to provide a demountable connection particularly well suited for attaching a handle as on the spreader ring of a creel net.

Another important object is to provide an improved creel net support comprising a split spreading ring, a handle and improved connection means for interconnecting the abutting ends of the split ring and for detachably connecting a handle rod on said ring, the connecting structure serving to interlock the handle rod with the abutting ends of the split ring.

Another important object is to provide an inexpensive sheet metal clip adapted to interlockingly receive offset or outstanding fingers formed at the abutting ends of a split creel net spreader ring whereby to secure said ends together, said clip being formed to interlockingly receive a handle rod in position thereon to lock the offset fingers of the spreader ring against removal thereof from the clip when said handle is in mounted position on the clip.

Another important object is to provide a demountable connection for joining a rod-like element on a supporting member, comprising an inexpensively formed sheet metal clip adapted to interfittingly receive therein projecting portions on the supporting member, and to interlockingly receive the rod-like element in position therein to lock the projecting portion of the supporting member against removal thereof from the clip when said rod member is in mounted position on the clip.

Among numerous other important objects of the invention is to provide a simple, rugged and inexpensive joining structure particularly well adapted for incorporation in a creel net support whereby the net supporting spreader ring may be secured on a handle and is easily demounted therefrom to facilitate removal of the net from the ring, the use of the demountable connection, of course, being not necessarily restricted to fishing net mountings.

The foregoing and numerous other important objects, features, and inherent functions of the invention will become apparent as the same is more fully understood from the following description, which, taken in connection with the accompanying drawings, discloses a preferred embodiment of the invention.

Referring to the drawings:

Fig. 1 is a perspective view of a rowboat showing an impounding device embodying the present invention in position and mounted on the boat;

Fig. 2 is an enlarged perspective view partly in section of a creel net and supporting structure embodying the present invention;

Fig. 3 is a sectional view taken substantially along the line 3—3 in Fig. 2; and Fig. 4 is a perspective assembly view of parts of the demountable structure of this invention.

To illustrate the invention the drawings show a fish impounding device 11 comprising a creel net 12 and a collapsible structure for mounting the net in operative position.

The net 12 preferably comprises an elongated tubular net having a closed end 13 and an open end 14 adapted to be mounted on a spreading ring 15 forming a part of the collapsible net mounting structure.

The spreader ring 15 preferably comprises a split ring having abutting ends 16 provided with projections forming outstanding fingers 17 and 17a at said abutting ends of the ring. Since the ring is split at said abutting end 16 the net 12 which has a plurality of mounting loops 18 at its open end, may be mounted on the spreader ring by passing the ring through the several loops until all of them are supported in position circling the ring.

Novel and improved connecting means 19 is provided for attaching a handle 20 on the spreader ring in a readily demountable fashion whereby to provide for the manipulation of the mounted net and anchorage thereof in position with the ring remote portions of the net submerged in water. To this end the handle 20 is preferably of rod-like configuration so that said handle may be deposited in the oarlock socket in the gunwale of a rowboat, whereby the open end 14 of the net may be supported above water level at the side of the boat while the remaining portions of the net may be submerged in the water alongside the boat. Caught fish may be thrown into the net through its open end and thus impounded alive and retained therein submerged in water for as long as desired. The mounting stem or handle 20 is preferably connected on the spreader ring to support the same in convenient position to receive caught fish thrown through the ring and into the net.

The spreader ring 15 and the handle 20 may conveniently comprise metal such as wrought iron rod or bar stock, and the parts are preferably connected together so that the handle rod makes an angle of the order of 135 degrees with respect to the plane of the ring. So arranged, the handle may be readily mounted, as in the oar-lock receiving socket 21 of the sort commonly provided in the gunwale member of a rowboat 23, the lower end of the handle 20 when so mounted being supported by gravity on a longitudinal extending structural member 24 of the boat. When so mounted it will be seen that the fish impounding net will be firmly secured to the boat with the spreader ring 15 extending outwardly of the same at a convenient inclination with the net 12 trailing in the water alongside the boat. The plane of the spreader ring may make an angle with respect to horizontal of the order of less than 45 degrees, when the device is mounted in an oarlock socket, whereby the ring will be supported at an inclination facilitating the depositing of caught fish into the net. The end of the handle 20 remote from the spreader ring, may be formed with a point 25 so that the handle may be driven in stake-like fashion into the ground, as at the shore or bank of a stream or pond, whereby to support the net mounting ring 15 at a convenient inclination for the receipt of caught fish therein, while trailing the net submerged in water alongside of the bank in which the device may be secured.

In order to facilitate the connecting of the handle member 20 on the spreader ring, the connecting means 19 comprises an improved clip construction embodying a preferably channel-shaped sheet metal clip 26 having spaced apart side walls 27 and a bottom wall 28 extended as a lug 29 at one open end of the clip, the lug being formed with an opening 30 therethrough. The side walls 27 are formed outwardly as at 31 to form the sockets as at opposite sides of the bottom wall of the clip, said sockets being shaped in conformity with the transverse sectional configuration of the outstanding fingers of the spreader ring; and the clip is sized to snuggly receive said fingers 17 and 17a in side by side contacting engagement in the sockets formed by the outwardly formed clip portions 31.

The fingers 17 and 17a, accordingly, may be inserted into the clip endwise at the open end of the clip carrying the lug 29. On one side the clip is provided with an indentation 32 in the outwardly formed portion 31 of the clip; and one of the fingers 17a is formed with a corresponding notch 33. Accordingly, the notched finger may be inserted in the clip and the notch interlocked with the indentation. Thereafter by flexing the spreader ring the unnotched finger may be passed into the clip alongside of the notched finger. When so arranged the clip will be firmly mounted on the fingers 17 and 17a and cannot be removed therefrom except by drawing the unnotched finger in an axial direction from the clip. The resilience of the spreader ring normally prevents such withdrawal.

The handle rod 20 at one end is formed with an offset neck 34 and a head 35; and the rod is sized for sliding insertion, pointed end first, through the opening 30, said opening being disposed outwardly of the ring fingers 17 and 17a when the same are mounted in interlocked position in the clip.

The handle bar thus may be inserted endwise through the opening 30 until the head 35 engages the underside of the lug 29 at the opening 30. The handle bar then may be sprung between the spaced walls 27 of the clip, which may be slightly bowed, as desired, to correspondingly receive and latch the handle bar in mounted position in the clip overlying the fingers 17 and 17a therein.

When mounted in the clip the connecting portion of the bar will block removal of the unnotched finger 17 and hence will prevent removal of the clip from the spreader ring so long as the handle bar is in mounted position in the clip. The resilience of the clip normally prevents removal of the bar from mounted position unless the bar is forced from the mounted position by swinging it therefrom about its head 35 as a pivot.

When it is desired to dismount the handle, however, the bar may be readily swung from latched position in the clip by grasping its clip remote end and swinging the handle as a lever about its head, as a pivot, then removing the bar from the opening 30 in order to release the unnotched finger 17 for slide removal from the clip, thus unlocking the notched finger 17a from its interlocking engagement with the indentation 32.

While the connecting means 19 is exceedingly well suited for using a connecting handle removably on the spreader ring of a fishing net it will be obvious that the use of the connection is not necessarily limited to fishing equipment, but may be employed wherever an inexpensive, yet rugged interlocking connector is desired.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of the attendant advantages, the form herein disclosed being merely a preferred embodiment for the purpose of describing the invention.

The invention is hereby claimed as follows:

1. A demountable structure comprising a plurality of members and a clip for interconnecting the members, said clip having resilient spaced wall portions forming an elongated channel having an open side and an open end, one of said members having outstanding fingers insertable in said channel in position with projecting portions of said fingers extending outwardly of said channel at the open end thereof, said clip having a lug formed with an opening and providing a seat disposed outwardly of the projecting portions of said fingers when the same are in mounted position in said clip, another of said members having a neck portion formed to extend in said opening and to rockingly engage said seat, and a rodlike portion adapted to be clippingly received in the open side of the channel and there held by and between said spaced wall portions in position blocking removal of said finger from said clip.

2. A demountable structure comprising a plurality of members and a clip for interconnecting the members, said clip having resilient spaced wall portions forming an elongated channel having an open side and an open end, one of said members having outstanding fingers insertable in said channel in position with projecting portions of said fingers extending outwardly of said channel at the open end thereof, said clip having a lug formed with a perforation and providing a seat disposed outwardly of the projecting portions of said fingers when the same is in mounted position in the clip, another of said members comprising a rod size for sliding assembly on the clip through said perforation and for clipping reception between said spaced wall portions of the clip, said rod being formed with an enlarged portion adapted to rockingly engage said seat, whereby the rod may be swung on the clip, about said seat as a pivot support, into position held by and between said spaced wall portions and blocking removal of said fingers from said clip.

3. A demountable structure comprising a plurality of members and a clip for interconnecting the members, said clip having resilient spaced wall portions forming an elongated channel having an open side and an open end, one of said members including a pair of outstanding fingers mountable in said channel in side by side relation and in position with projecting portions of said fingers extending outwardly of the channel at the open end thereof, said clip having a lug formed with an opening therein and disposed outwardly of said projecting portions of the fingers when the same are in mounted position in the clip, another of said members having a neck portion formed for interfitting pivotal connection in said opening on said lug, and a rodlike portion adapted to be clippingly received in the open side of the channel and there held by and between said spaced wall portions in position blocking removal of said fingers from said clip.

4. A demountable structure comprising a plurality of members and a clip for interconnecting the members, said clip having resilient spaced wall portions forming an elongated channel having an open side and an open end, one of said members including a pair of outstanding fingers mountable in said channel in side by side relation and in position with projecting portions of said fingers extending outwardly of the channel at the open end thereof, said clip and one of said fingers being formed for interfitting engagement preventing relative movement of said finger in the clip, whereby said finger when mounted comprises an interlocked finger when both fingers are in clip mounted position, the other of said fingers comprising an unnotched finger removable from the clip to release said interlocked finger for detachment from the clip, said clip having a lug formed with an opening therein and disposed outwardly of the projecting portions of said fingers when the same are in mounted position in the clip, another of said members having a neck portion formed for interfitting pivotal connection in said opening on said lug and a rodlike portion adapted to be clippingly received in the open side of the channel and there held by and between said spaced wall portions in position blocking removal of said latching finger from said clip.

5. A demountable structure comprising a plurality of members and a clip for interconnecting the members, said clip having resilient spaced wall portions forming an elongated channel having an open side and an open end, one of said members including a pair of outstanding fingers mountable in said channel in side by side relation and in position with projecting portions of said fingers extending outwardly of the channel at the open end thereof, said clip and one of said fingers being formed for interfitting engagement preventing relative movement of said finger in the clip, whereby said finger when mounted comprises an interlocked finger when both fingers are in clip mounted position, the other of said fingers comprising an unnotched finger removable from the clip to release said interlocked finger for detachment from the clip, and interfitting means on said clip and on another of said members for removably securing the said other member on said clip in position blocking removal of said latching finger from said clip.

6. A demountable structure comprising a plurality of members and a clip for interconnecting the members, said clip having resilient spaced wall portions forming an elongated channel having an open side and an open end, one of said members including a pair of outstanding fingers mountable in said channel in side by side relation and in position with projecting portions of said fingers extending outwardly of the channel at the open end thereof, and interfitting means on said clip and on another of said members, for removably securing the said other member on the clip in position blocking removal of said fingers from the clip.

7. A demountable structure comprising a plurality of members and a clip for interconnecting the members, said clip having resilient spaced wall portions forming an elongated channel having an open side and an open end, said members including a pair of offset fingers mountable in said channel in side by side relation and in position with projecting portions of said fingers extending outwardly of the channel at the open end thereof, said clip and one of said fingers being formed for interfitting engagement preventing relative movement of said finger in the clip, whereby said finger when mounted comprises an interlocked finger when both fingers are in clip mounted position, the other of said fingers comprising a latching finger removable from the clip to release said interlocked finger for detachment from the clip.

8. A demountable fish net structure comprising a split ring containing a fish net and having abutting ends formed with offset fingers, a handle bar, and a clip for connecting the fingers together and with said bar comprising a channel member having resilient spaced wall portions forming an elongated channel having an open side and an open end, said channel being formed to receive said fingers in side by side contacting engagement, within the channel thereof, in position with the ring connected ends of said fingers extending outwardly of said channel at the open end thereof, said clip having a lug formed with an opening therein and disposed outwardly of the ring connected ends of said fingers when the same are in mounted position in the clip, said handle bar having a neck portion formed for interfitting and pivotal connection in said opening on said lug in position to be clippingly received in the open side of the channel and secured to the clip by and between said spaced wall portions in position blocking removal of said fingers from said clip.

9. A demountable fish net structure comprising a split ring containing a fish net and having abutting ends formed with offset fingers, a handle bar, and a clip for connecting the fingers together and with said bar comprising a channel member having resilient spaced wall portions forming an elongated channel having an open side and an open end, said channel being formed to receive said fingers in side by side contacting engagement, within the channel thereof, in position with the ring connected ends of said fingers extending outwardly of said channel at the open end thereof, said clip and one of said fingers being formed for interfitting engagement preventing relative movement of said finger in the clip, whereby said interfitted finger when mounted comprises an interlocked finger when both fingers are in mounted position in said clip, the other of said fingers comprising an unnotched finger removable from the clip to release said interlocked finger for detachment from the clip, said clip and said handle bar being formed with interfitting means for removably securing said bar on the clip in position blocking removal of said latching finger from said clip when the bar is in clip mounted position.

10. A fish impounding device comprising a spreader ring having a net therein, a mounting stem, a clip for securing the mounting stem on the spreader ring, said ring constituting a split ring having abutting ends formed with offset fingers, and said clip comprising a channel member having resilient spaced wall portions forming an elongated channel having an open side and an open end, said channel being formed to receive said fingers in side by side contacting engagement, within the channel thereof, in position with the ring connected ends of said fingers extending outwardly of said channel at the open end thereof, said clip and said mounting stem being formed with interfitting means for removably securing said stem on the clip in position blocking removal of said fingers from said clip when the stem is in clip mounted position.

CLIFFORD G. THORSEN.

REFERENCES CITED

The following references are of record in the file of this patent:

UNITED STATES PATENTS

| Number | Name | Date |
|---|---|---|
| 62,332 | Heyden | Feb. 26, 1867 |
| 103,632 | Locke | May 31, 1870 |
| 148,702 | Hix | Mar. 17, 1874 |
| 527,785 | Grauten | Oct. 23, 1894 |
| 577,576 | Garnhart | Feb. 23, 1897 |
| 796,294 | Clark | Aug. 1, 1905 |
| 939,508 | Hull | Nov. 9, 1909 |
| 972,870 | Kandelbinder | Oct. 18, 1910 |
| 1,092,217 | Hopkins | Apr. 7, 1914 |
| 1,164,406 | Schaefer | Dec. 14, 1915 |
| 1,401,402 | Hawthorne | Dec. 27, 1921 |
| 1,532,367 | Bockman | Apr. 7, 1925 |
| 1,773,927 | Mills | Aug. 26, 1930 |

FOREIGN PATENTS

| Number | Country | Date |
|---|---|---|
| 212,688 | Great Britain | Mar. 20, 1924 |
| 303,978 | Great Britain | Jan. 17, 1929 |
| 44,229 | Sweden | Aug. 8, 1917 |
| 439,894 | France | June 26, 1912 |
| 480,643 | France | Aug. 31, 1916 |